United States Patent [19]
Wolga

[11] 3,907,436
[45] Sept. 23, 1975

[54] OPTICAL ALIGNMENT DEVICE PROVIDING A VIRTUAL PIVOTING LASER

[76] Inventor: George J. Wolga, P.O. Box 730, Ithaca, N.Y. 14850

[22] Filed: Feb. 5, 1974

[21] Appl. No.: 439,948

[52] U.S. Cl. ................ 356/153; 356/138; 350/285
[51] Int. Cl. .......................................... G01b 11/26
[58] Field of Search ............ 356/153, 138; 350/285

[56] References Cited
UNITED STATES PATENTS
3,724,953  4/1973  Johnston............................ 356/153

*Primary Examiner*—Ronald L. Wibert
*Assistant Examiner*—Paul K. Godwin

[57] ABSTRACT

An arrangement for orienting optical elements includes a pivoting mirror mounted for rotational adjustment at the point of intersection (the real pivot point) of two orthogonal rotational axes. The reflected beam emerges from the real pivot point at a variable angle as rotational adjustments to the mirror are made. The reflected beam passes through a second (output) lens which forms an image, the virtual pivot point, of the real pivot point at a distance in front of the output lens. The position of the virtual pivot point can be adjusted to position it on the input aperture of the optical element to be aligned. This is done by moving the output lens along its axis and by shifting it vertically and horizontally at right angles to its axis.

6 Claims, 3 Drawing Figures

US Patent  Sept. 23,1975  3,907,436

OPTICAL ALIGNMENT DEVICE PROVIDING A VIRTUAL PIVOTING LASER

BACKGROUND OF THE INVENTION

1. Field of the Invention

The invention relates to a device for aligning optical systems which provides a ray whose angle can be changed while always passing through a single point at the entrance aperture of the system being aligned.

2. The Prior Art

The patent to Johnston, U.S. Pat. No. 3,724,953, issued Apr. 3, 1973 discloses an arrangement which includes a pivoting mirror, mounted for pure rotational movement at the intersection of two orthogonal, intersecting, rotational axes, called the real pivot point. The input beam from the laser strikes this mirror at the real pivot point, and the reflected beam emerges from this stationary pivot point at a variable angle as rotational adjustments to the mirror are made. The reflected beam passes through an output lens, which forms an image, the virtual pivot point, of the real pivot point at a distance in front of the output lens given by the lens maker's formula. The stationariness of the beam at the real pivot point is transferred to its image, the virtual pivot point, where the input aperture of the system being aligned is located. Only the angle of the beam through the virtual pivot point changes as pivoting mirror adjustments are made.

The virtual pivot alignment device solves the problem of pointing a laser beam through an optical system defined by an entrance and exit aperture a given distance apart by providing a means for adjusting the beam direction while simultaneously insuring that the beam continues to pass through a fixed, remote point in space — the virtual point. Alignment of the beam to the system is rapidly done by first positioning the virtual pivot on the entrance aperture, and then adjusting the beam direction to pass the beam through the exit aperture.

SUMMARY OF THE INVENTION

While the device of the Johnston patent operates very satisfactorily, it has been found unnecessarily complicated and expensive and the purpose of the present invention is to provide a simplified device for accomplishing the same result.

In essence, in the Johnston patent the gimbaled mirror, the fixed mirror and the laser are mounted on a frame which is mounted for adjustment in two orthogonal directions, namely the horizontal and vertical axes perpendicular to the axis of the output lens. The output lens and the diversion correction lens are mounted for conjoint sliding movement in the frame while the optical distance between them is kept constant. This means that the emitting laser and all the other parts must be mounted on this frame, and if the pivots of the frame are disturbed the operation of the device is interfered with.

According to the present invention, the emitting laser, the gimbal mounted mirror and the fixed reflecting mirror are all mounted on a stationary frame, while the output lens is mounted on that frame for movement along its axis and is movable transversely of its axis. Movement of the output lens along its axis serves to position the virtual pivot point in the plane of the inlet aperture of the device to be aligned, while shifting the lens transversely to its axis shifts the virtual pivot point in such plane to a position where it coincides with the inlet aperture. Tilting of the gimbal mounted mirror then produces the desired angular shifting of the beam while it always passes through the virtual pivot point.

DESCRIPTION OF THE PREFERRED EMBODIMENTS

Figure 1:
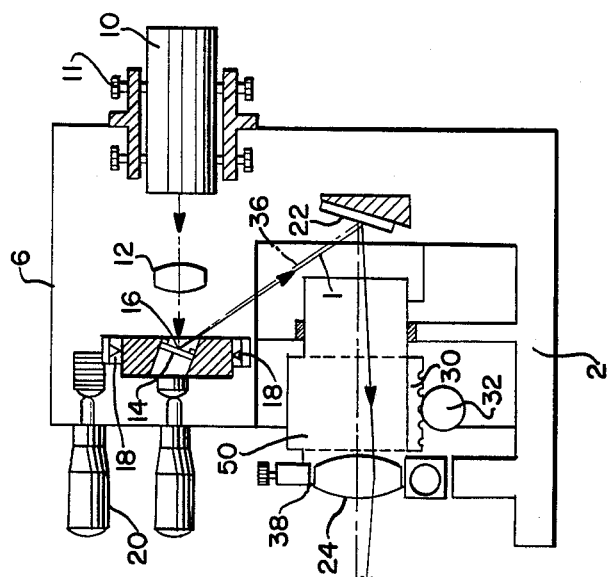
FIG. 1 shows diagrammatically a virtual pivot alignment device according to the invention.
Figure 2:
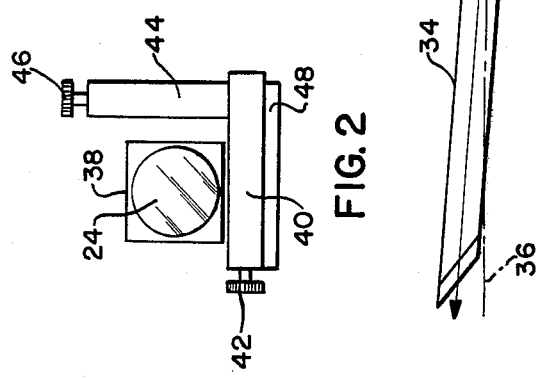
FIG. 2 is a view from the left-hand side of FIG. 1 of the mounting for the output lens.

Referring now to FIG. 1, the path of the laser beam through the device is indicated by the ray 1. It will be noted that in FIG. 1, this ray forms a "Z" pattern in traversing the device; this is not necessary for the functioning of the device, and this ray could be laid out in an L- or U-shape, for example, as desired in shaping the external package of the device.

Referring once again to FIG. 1, there is a base 2 which carries a laser 10, the output beam 1 of which enters a divergence correction lens 12 and is reflected by a plane mirror 14 mounted for movement about two inter-secting axes of rotation at right angles to each other. The mirror mounting is indicated diagrammatically by the axes 16, 18 and the micrometers 20, and the mounting may be for example of the type shown in Wolga U.S. Pat. No. 3,289,311. The front surface of the mirror 14 contains the point of intersection of the axes 16, 18; this point being called the real pivot point. The lens 12 is mounted so that its axis intersects the real pivot point. The mounting of the laser 10 to the base 2 includes a means of adjustment 11 of the direction and position of the beam 1 emerging from the laser, so that this emerging beam may be made accurately coincident with the axis of the lens 12, and thus the beam strikes the mirror 14 with the beam center accurately located at the real pivot point. The reflecting surface of the mirror 14 is at an angle substantially different from a right angle to the direction of the incoming ray 1, so that the reflected beam is not intercepted by the lens 12. In the Z configuration, the base 2 also carries a second plane mirror 22, the surface of which is in the line of rays passing through the lens 12 and reflected from the mirror 14, and its reflecting surface is substantially parallel to that of mirror 14 when the pivoting mirror 14 is adjusted to the middle of its range of motion. The beam reflected by the mirror 22 passes to an output lens 24, and from that to a virtual pivot point 26 to be described below. The axes of the two lenses 12, 24 are parallel. The optical path length along the beam direction between the two lenses is normally adjusted to be substantially equal to the sum of the focal lengths of the two lenses, in order for the divergence, or spreading angle, of the beam emerging from the output lens 24 be a minimum as described below.

The output lens 24 is mounted in a frame 38 which is slidable transversely to the axis of the lens in a ball bearing slide in bar 40, being adjustable by a threaded member turnable by knob 42. Bar 40 in turn is mounted for vertical adjustment on a member 44 by a threaded rod operated by knob 46. The member 44 is mounted on a frame 48 which is slidable on cylindrical tube 50 mounted in base 2 and can be adjusted by rack 30 and a pinion operated by knob 32 to move the adjusting unit in the direction of the longitudinal axis of the output lens 24.

The operation of the device will now be explained. The laser beam is directed through the divergence correction lens 12 on to the pivot point of a gimbaled mirror mount 14.

The plane pivoting mirror 14 directs the beam onto the plane folding mirror 22, and out through the output lens 24. The lens 24 forms an image (the virtual pivot point), at a distance to the left of 24 given by the thin lens formula $(1/S_1 + 1/S_2 = 1/f)$, of the (real) pivot point of the gimbaled mirror. The real pivot point is stationary as the gimbaled mirror mount is adjusted and only the direction of the beam emerging from the pivoting mirror changes. The same is true of the image of the pivot point — this provides the virtual pivoting action of the output beam described above. The output beam always intersects the virtual pivot point as the gimbal adjustments are varied, only the direction of the beam in going through the virtual pivot changes.

The procedure for use of the device is as follows: First, the pivot projection distance is set equal to the lens 24 — entrance aperture distance by focussing 24 by knob 32.

The transverse virtual pivot position adjustments 40, 44 are next used to center the virtual pivot point in the entrance aperture. Finally, the gimbal angular adjustments are varied to center the beam in the exit aperture, and to walk to beam around the "best alignment" setting to check for a symmetrical set of transmitted patterns.

The device then operates in the manner described in the Johnston U.S. Pat. No. 3,724,953 referred to above.

Figure 3:
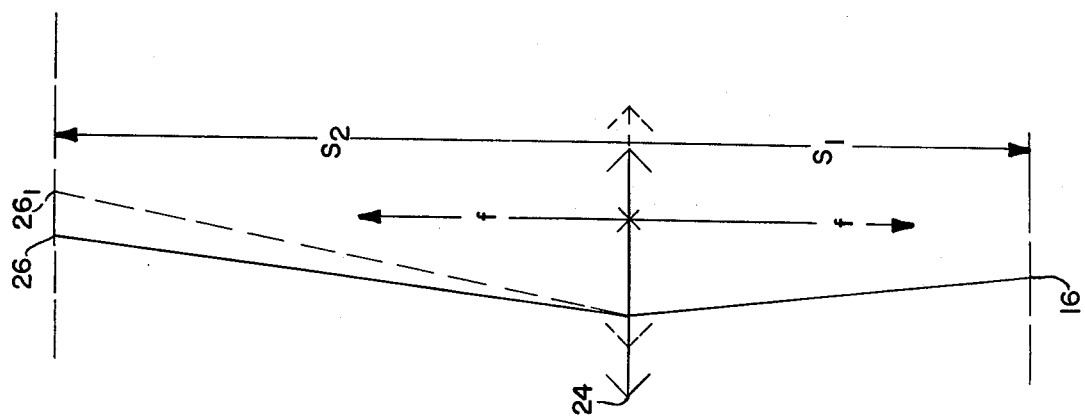
FIG. 3 is an explanatory diagram.

With reference to FIG. 3, this shows how the shifting of the output lens 24 shifts the virtual pivot point 26. When the lens shifts from the position indicated by the solid arrows to that of the broken arrows, the virtual pivot point shifts to the position 26', while remaining parallel to the plane of the lens 24. $S_1$ and $S_2$ are the distances of the real and virtual pivot points from the lens 24.

I claim:
1. The combination with a means for emitting a beam of radiant energy, means to allow variation in the direction of the beam and means to guide such beam in a path such that the beam always passes through a virtual pivot point in space at a distance from the emitting means while the direction of the beam passing through such virtual pivot point varies in at least two orthogonal directions, means defining a real pivot point along said path, including means for imaging the beam from said real pivot point at said virtual pivot point, and means mounting said imaging means for movement with respect to said variation allowing means along its axis to vary the distance of the virtual pivot point from the real pivot point and in two orthogonal directions transverse to its axis independently of the direction varying means and the real pivot point defining means.

2. The combination as claimed in claim 1, said direction varying means comprising a plane pivoting mirror mounted in said path for angular adjustment about transverse intersecting axes with the front surface of the mirror including the point of intersection of said axes, said point constituting the real pivot point, adjustment of the mirror producing the change in the direction of the beam.

3. The combination as claimed in claim 2, said imaging means being convergent and having an axis, which includes a fixed mirror in said path between the pivoting mirror and the convergent imaging means, the surface of said fixed mirror being substantially to the surface of said pivoting mirror when the beam passes through the axis of the convergent imaging means.

4. The combination as claimed in claim 3, which includes a frame mounted for lineal movement in the direction of the axis of the convergent imaging means, said frame carrying said imaging means.

5. The combination as claimed in claim 4, said guiding means including divergence correction lens means in said path between said emitting means and said convergent imaging means.

6. The combination as claimed in claim 1, said beam emitting means comprising a laser.

* * * * *